United States Patent [19]

McArthur

[11] 4,184,476

[45] Jan. 22, 1980

[54] SOLAR ENERGY COLLECTING APPARATUS

[76] Inventor: William H. McArthur, P.O. Box 236, Forest City, N.C. 28043

[21] Appl. No.: 827,948

[22] Filed: Aug. 26, 1977

[51] Int. Cl.$^2$ .............................................. F24J 3/02
[52] U.S. Cl. ..................... 126/429; 126/431
[58] Field of Search ............... 126/270, 271; 237/1 A; 165/48.49, 166, 171, 172, 173

[56] References Cited

U.S. PATENT DOCUMENTS

| | | | |
|---|---|---|---|
| 1,742,861 | 1/1930 | Johnson | 126/271 |
| 4,019,494 | 4/1977 | Safdari | 126/270 |
| 4,020,989 | 5/1977 | Kautz | 126/270 |
| 4,083,360 | 4/1978 | Courvoisier et al. | 126/271 |
| 4,098,260 | 7/1978 | Goettl | 237/1 A |
| 4,114,595 | 9/1978 | Barker | 237/1 A |

*Primary Examiner*—James C. Yeung
*Attorney, Agent, or Firm*—Bell, Seltzer, Park & Gibson

[57] ABSTRACT

A solar energy collecting apparatus which is integrally incorporated into a conventional building structure so that it does not protrude from the normal contour of the building, and which utilizes components of the building structure as a part of the collecting apparatus to thereby minimize the cost thereof. The collecting apparatus includes a solar energy absorptive panel which is adapted to be mounted between the conventional support members in the wall or roof of a building, and which includes an outwardly facing dark collecting surface, and an opposite inner surface having fins integrally formed therein to facilitate transfer of heat to air passed therealong.

17 Claims, 12 Drawing Figures

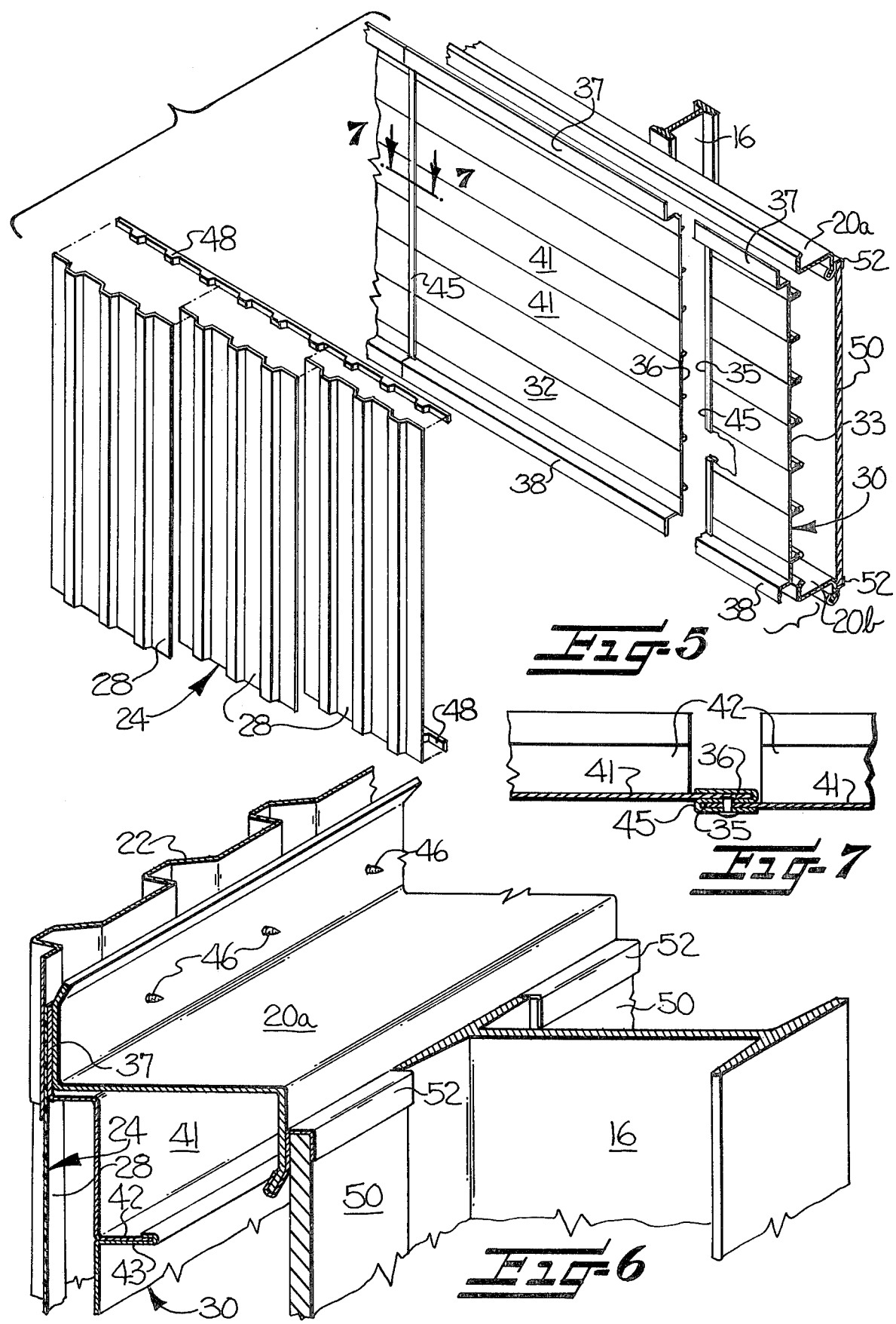

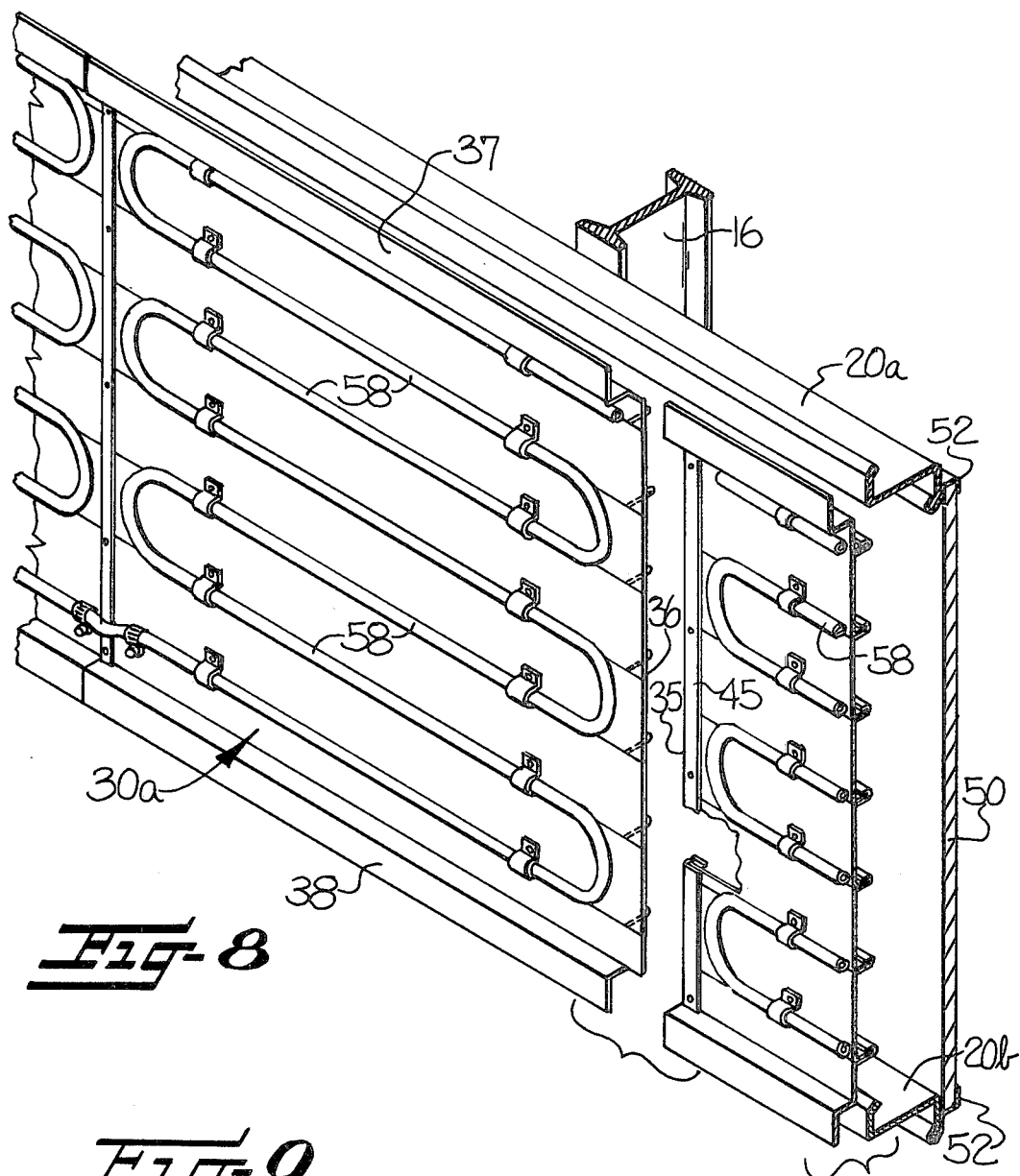
Fig-8
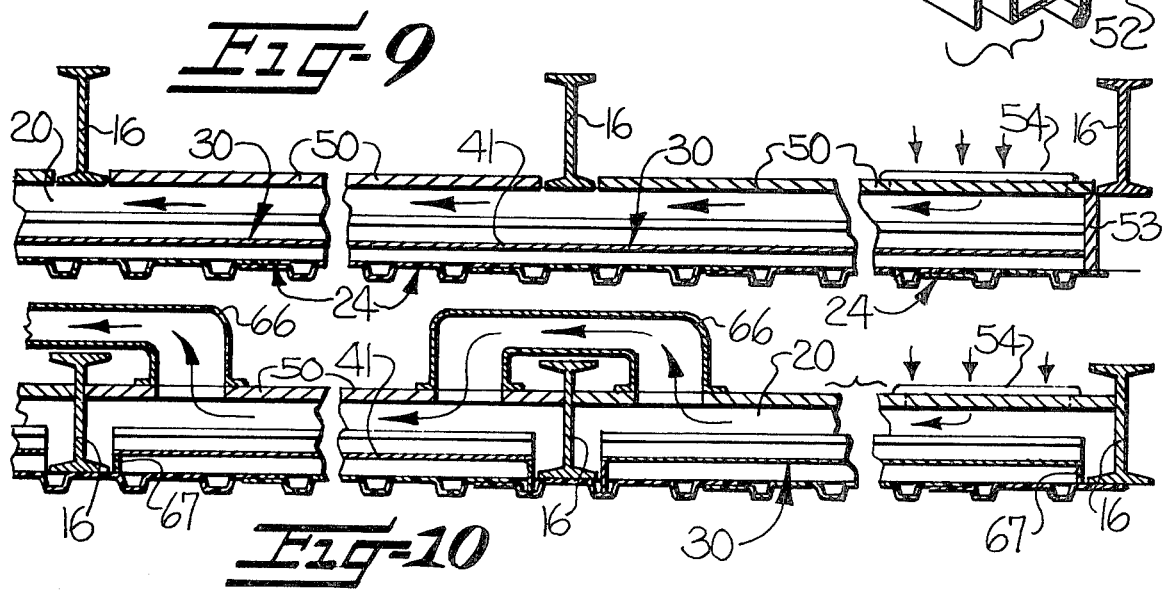
Fig-9
Fig-10

SOLAR ENERGY COLLECTING APPARATUS

The present invention relates to a solar energy absorptive panel for use in a solar energy collector, and to a wall and building structure having the solar energy absorptive panel integrally incorporated therein.

In recent years, solar heating systems for collecting, storing and distributing the sun's heat energy to the interior of a building have been the subject of considerable developmental activity. Typically, known systems include solar collectors in the form of large rectangular frames which are placed directly on a roof or wall of the building, and which comprise a sheet metal solar energy absorber, a covering sheet of glass or plastic which is transparent to solar radiation, and an insulating material behind the absorber. In an air type collector, air is adapted to be passed along the absorber so as to absorb heat therefrom, and the heated air is then ducted directly into the interior of the building or to a heat storage unit. In a liquid type collector, water or similar liquid is passed through channels attached to the absorber, and then is piped to a heat transfer unit or storage unit.

The above described conventional solar collectors possess several disadvantages which have hindered widespread acceptance and use. Among these disadvantages is the high initial cost of the collectors, and the fact that expensive changes are often required in the building structure to accommodate the collectors. Further, the collectors protrude from the normal exterior of the building, and are often unsightly.

It is accordingly an object of the present invention to provide a low cost solar energy collecting apparatus which overcomes the above disadvantages.

It is more particular object of the present invention to provide a solar collecting apparatus which may be built into the roof or exterior wall of a standard building, such as a conventional prefabricated metal building, and without changing the normal contour of the exterior of the building.

It is also an object of the present invention to provide a solar collecting apparatus which utilizes certain of the structural components of a conventional building as part of the solar collector, to thereby minimize the cost of the collector.

These and other objects and advantages of the present invention are achieved in the embodiments illustrated herein by the provision of a building wall structure which integrally incorporates a solar collector, and which comprises a plurality of parallel, spaced apart structural support members, transparent exterior panel means mounted to the outside edges of two adjacent support members, solar energy absorptive means mounted between the two adjacent support members and underlying the transparent panel means, and means for conveying a fluid along the solar energy absorptive means whereby the solar energy is collected by the absorptive means and transferred to the fluid. Additional exterior panel means are mounted to the outside edges of the remaining support members, such that the transparent panel means and additional panel means are substantially co-planar and collectively define the exterior surface of the wall structure.

In a preferred embodiment, the solar energy absorptive means comprises a number of generally rectangular panels of metallic sheet material having a dark coating overlying the outer surface thereof, and a plurality of parallel fins integrally formed from the material of the sheet and extending outwardly from the opposite surface thereof. Each panel is composed of a plurality of interconnected side by side U-shaped sections, with the adjacent sides of the adjacent U-shaped sections forming the fins. Slot means in the form of an S-shaped clip is mounted along one end edge of each panel for receiving the other end edge of another like panel therein, whereby the panels may be readily joined in an end-to-end arrangement. In addition, interior panel means are mounted to the inside edges of the two structural support members, such that the solar energy absorbing panels, two support members, and interior panel means collectively define an air passageway through which air is circulated, with the finned surface of the solar energy absorbing panels extending into the passageway to facilitate heat transfer to the circulating air.

Some of the objects of the invention having been stated, other objects will appear as the description proceeds when taken in connection with the accompanying drawings, in which FIG. 1 is a perspective view, partly broken away, of a building structure embodying the present invention;

FIG. 2 is a fragmentary perspective view of a portion of the structural frame of a conventional building structure of the type illustrated in FIG. 1;

FIG. 3 is a fragmentary sectional elevation view of a portion of the structural frame illustrated in FIG. 2, and further illustrating the exterior panels, FIG. 4 is a fragmentary sectional elevation view of the building structure illustrated in FIG. 1 and taken substantially along the line 4—4, and illustrating the solar energy collection apparatus of the present invention positioned in the exterior wall thereof;

FIG. 5 is a fragmentary exploded perspective view of the solar energy collection apparatus shown in FIG. 4;

FIG. 6 is a fragmentary perspective view of the portion of the solar energy collecting apparatus indicated at 6 in FIG. 4;

FIG. 7 is a fragmentary sectional plan view illustrating the structure by which the panels are interconnected, and taken substantially along the line 7—7 of FIG. 5;

FIG. 8 is a fragmentary exploded perspective view of another embodiment of a solar energy collecting apparatus in accordance with the present invention;

FIG. 9 is a fragmentary sectional plan view illustrating the solar energy collecting apparatus of FIGS. 1 and 4-6;

FIG. 10 is a view similar to FIG. 9 but illustrating another embodiment of the present invention and wherein the horizontal support members or purlins of the building structure are disposed flush with the exterior of the structural beams;

Figures 1, 2, 3, 4:
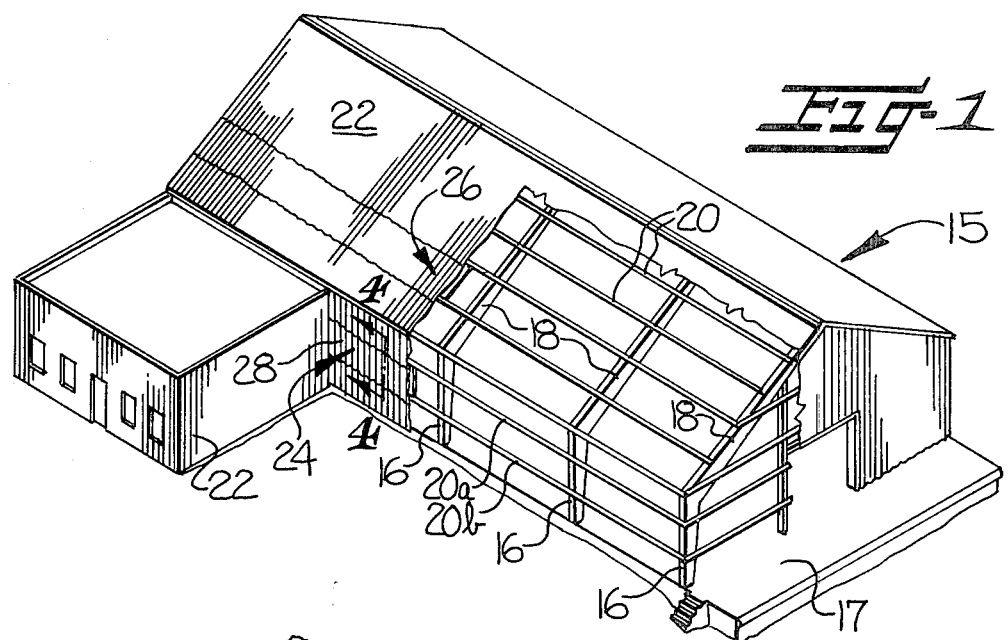

Referring more specifically to the drawings, FIG. 1 illustrates a building 15 which incorporates the solar energy collecting apparatus of the present invention. Certain structural components of the building are essentially conventional, and as indicated in FIGS. 2 and 3, the conventional structural components include a plurality of spaced-apart vertical structural beams or columns 16 mounted on a foundation 17 and defining the exterior periphery of the building. In addition, a number of inclined structural beams or rafters 18 are supported by the columns 16 and define the roof of the building, and a plurality of horizontal, spacedapart support members or purlins 20 are attached to and extend perpendicularly between the structural beams along the walls as well as the roof of the building.

The purlins 20 are essentially Z-shaped in cross-sectional configuration and are attached to the outside edges of the columns 16 and rafters 18. A plurality of rectangular exterior panels 22 are mounted in an overlapping, side by side arrangement to the outside edges of the purlins to form the exterior surface of the side walls and roof. Typically, the columns 16 are spaced apart about 20 to 25 feet, and the purlins 20 are spaced about 5 feet from each other. The exterior panels 22 typically measure about 3 by 11 feet, and are fabricated from a metallic or opaque plastic sheet material having a corrugated cross-sectional configuration to improve the rigidity thereof.

In accordance with the embodiment of the present invention as illustrated in FIG. 1, the wall and roof of the building 15 which face in a southerly direction each integrally incorporate a solar energy collector 24 and 26 respectively, with the collectors being characterized by the absence of components which protrude outwardly beyond the contour of the building structure. While the wall collector 24 is described in detail herein, it will be appreciated that the roof collector 26 is of similar construction.

Figure 12:
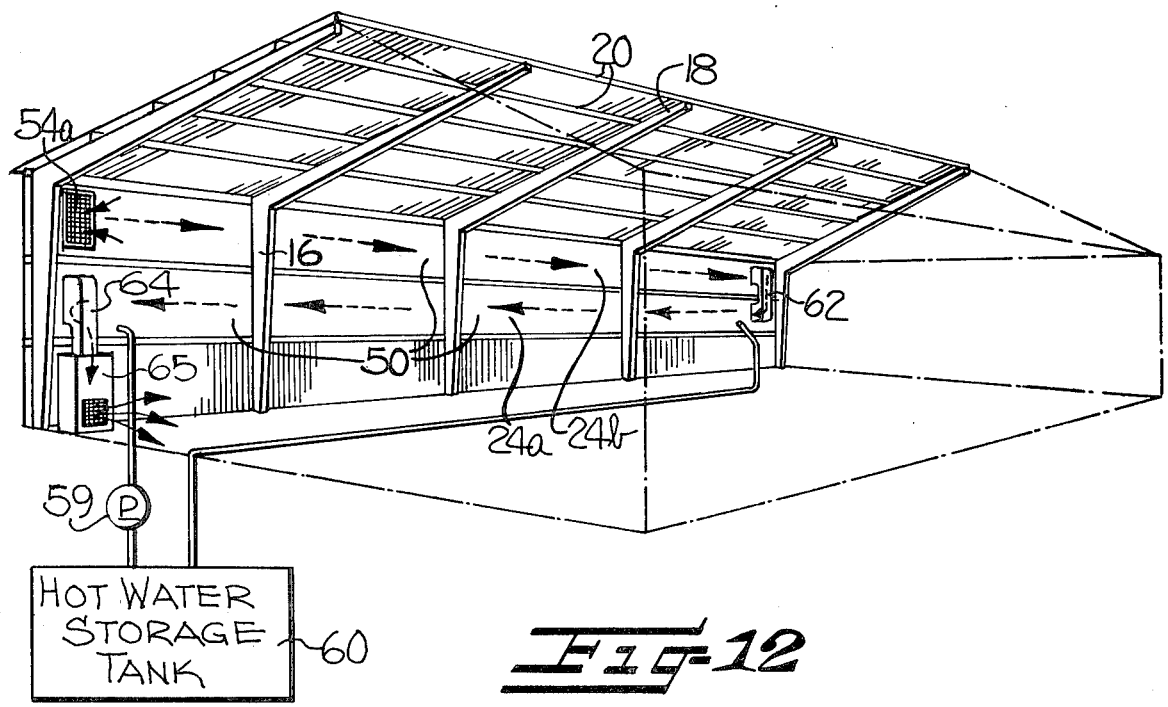
FIG. 12 is a view similar to FIG. 11 but illustrating another embodiment of the present invention and wherein the vertical exterior wall incorporates two parallel solar energy collectors therein.

The wall collector 24 includes a plurality of exterior panels 28 formed of a material transparent to solar radiation and mounted to the outside edges of two adjacent purlins 20a and 20b. The transparent exterior panels 28 are mounted in an overlapping side by side arrangement along the length of the purlins, and they are preferably similar in cross-sectional configuration to the remaining exterior panels 22, such that the transparent panels 28 and remaining panels 22 are substantially co-planar and collectively define the exterior surface of the wall. Stated in other words, the transparent exterior panels 28 match the general appearance of the remaining panels 22 (with the exception of being transparent), and thus they do not change the normal contour of the exterior of the building 15. As a particular example, the transparent panels 28 may comprise a conventional plastic skylight panel, having a width of about 3 feet and a length of about 5½ feet so as to extend between the purlins 20 and leaving a few inches to overlap the panel 22 positioned below, note FIG. 4. Where side by side collectors are employed as illustrated in FIG. 12, the panels 28 preferably are the normal 11 feet in length so as to extend across both collectors.

The collector 24 further comprises solar energy absorptive panel means mounted to extend between the two adjacent purlins 20a and 20b and underlying substantially the full area of the transparent exterior panels 28. More particularly, the solar energy absorptive panel means comprises a plurality of individual, generally rectangular panels 30 of a heat conducting material, such as 0.019 gauge diamond embossed aluminum sheeting. Each panel 30 defines a generally planar outer surface 32 facing the transparent exterior panel, an opposite surface 33, and opposite end edges 35, 36, and opposite side edges 37, 38. The outer surface 32 is coated with a dark, energy absorbing surface, such as black paint. In addition, each panel 30 is composed of a plurality of U-shaped sections which extend between the end edges, with each section having a planar medial portion 41 and inwardly extending sides 42, 43. The sides of adjacent sections abut and are interconnected by means of an overlapping lip on the side 43, to thereby form a plurality of fins extending outwardly from the opposite surface 33 of the sheet and continuously between the opposite end edges 35, 36. Typically, the fins are equally spaced apart a distance of about 8 inches, and they are about 2 inches in height.

Each panel 30 further includes slot means along the end edge 35 for receiving the other end edge 36 of another like panel therein, whereby a number of panels may be readily joined in an end-to-end arrangement and with the fins extending in a common direction. As best seen in FIG. 7, this slot means preferably comprises a clip 45 having an S-shaped cross-sectional configuration, with the clip being fixedly mounted along the end edge 35 of the panel by a rivet or the like. If desired, the fins of one panel may be laterally offset from the fins of the adjacent panels to facilitate heat transfer to the adjacent airstream as further described below.

The side edges 37, 38 of the panels 30 are offset in a common direction a distance of about one inch, such that the offset side edge portions are co-planar with respect to each other and parallel to the plane of the outer surface 32. These offset side edge portions are adapted to be positioned upon the outside edges of the purlins 20a, 20b and thus underlie the overlapping exterior panels 22 and 28 (note FIG. 6), and serve to provide an insulating air space between the exterior panels 28 and solar energy absorbing panels 30. The overlapping exterior panels 22 and 28 and panels 30 are attached to the purlins 20a, 20b by means of self-threading screws 46 or the like, note FIG. 6. In this regard, a side edge seal in the form of an elongate foam strip 48 having a configuration corresponding to that of the exterior panel may be positioned intermediate the external panels 28 and offset side edges 37, 38 of the panels 30 to prevent passage of air therebetween and thus form a closed insulating airspace between the panels 28 and 30, note FIG. 5.

The wall collector 24 further includes interior panel means mounted to the inside edges of the two purlins 20a, 20b. This interior panel means is transversely aligned with the exterior panels 28, and comprises a plurality of individual, side by side panels 50 formed of a rigid fiberglass ductboard or similar material. The panels 50 may be attached by means of clips 52 which extend along the inside edges of the purlins 20a, 20b, or by some other suitable means.

From the above description, it will be seen that the solar energy absorbing panels 30, two purlins 20a, 20b, and interior panels 50 collectively define an enclosed air passageway which extends along the length of the wall. As best seen in FIG. 9, the interior panels 50 terminate at the columns 16, and such that the outside faces of the columns form a portion of the passageway. In addition, a suitable partition 53 is mounted between the purlins to close the ends of the passageway, as well as preclude the entry of air between the exterior panels 28 and energy absorbing panels 30. By this arrangement, the passageway is able to continue uninterrupted along the entire length of the wall structure. Also, the fact that the purlins which form the side edge of the passageway are part of the conventional building structure, results in the cost of the collector being minimized.

Figure 11:
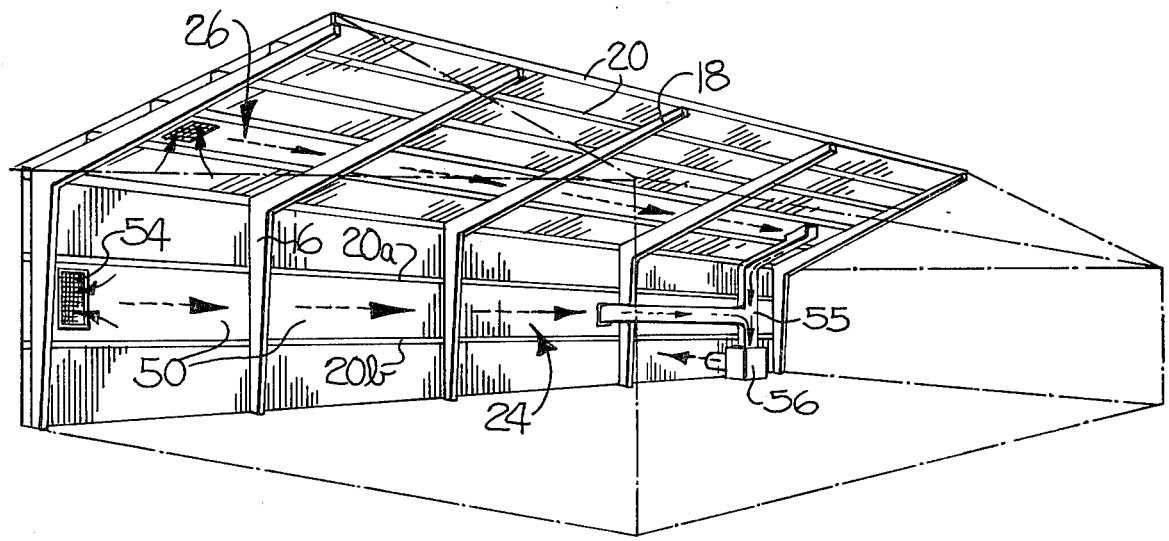
FIG. 11 is a fragmentary perspective view of the interior of the building illustrated in FIG. 1.

Means are provided for conveying air through the above described passageway, and as seen in FIG. 11, this conveying means comprises an inlet grill 54 at one end of the passageway and an air duct 55 and blower 56 at the opposite end of the passageway. As illustrated, the air duct and blower also communicate with the passageway of the roof collector 26. Also, it will be apparent that the extent to which the side edges 37 and 38 of the panels 30 are offset determines the volume of the passageway, and thus the offset may be designed to provide the desired velocity of the air in the passageway for a given blower system.

In operation, solar energy passes through the transparent exterior panels 28 of the two collectors 24, 26, and warms the solar energy absorbing panels 30, and the air passing along the passageways contact the finned surfaces 33 of the panels and absorbs heat therefrom. The heated air may then be conveyed to a desired area of the building for heating purposes, or any other desired use.

FIGS. 8 and 12 illustrate a modified embodiment of the present invention wherein heat may be recovered from the solar energy absorptive panels 30a by means of a tubular conduit 58, such as copper tubing, mounted in heat transfer relationship to the outside surface of the energy absorptive panels 30a. Water may be conveyed through the tubular conduit by means of a pump 59, and the heated water conveyed to a hot water storage tank 60 or the like, note FIG. 12. Suitable controls (not shown) may also be provided whereby either air flow through the passageway, or water flow through the conduit 58 may be used to remove and recover the heat absorbed, or both systems may be operated concurrently.

FIG. 12 illustrates a further embodiment of the invention wherein collectors 24a, 24b substantially as described above are provided between each of two vertically adjacent pairs of purlins. A transfer duct 62 is positioned between the collectors at one end thereof, whereby the air enters one collector through a grill 54a and passes through both collectors 24a and 24b before being withdrawn through the outlet duct 64 by blower 65.

In certain conventional building structures of the described type, the purlins are positioned within the outline of the structural columns 16 and so as to be flush with the outside edges thereof. This construction is illustrated in FIG. 10. The present invention may be readily employed for use with such buildings by the use of transfer ducts 66 extending around the columns to thereby form a continuous air passageway along the full length of the wall or roof. Also, the panels 30 are constructed so as to terminate adjacent the columns, and a closure partition 67 may be positioned along the end edges of the panels to prevent air from entering the insulating airspace between the panels 30 and exterior panels 28.

In the drawings and specification, there has been set forth a preferred embodiment of the invention, and although specific terms are employed, the are used in a generic and descriptive sense only and not for purposes of limitation.

That which is claimed is:

1. A wall structure adapted to form an exterior wall or roof of a building and having a solar energy collector integrally incorporated therein, and wherein the solar energy collector is characterized by the absence of components which protrude outwardly beyond the normal contour of the wall structure, and comprising a plurality of parallel, spaced apart structural support members, exterior panel means which are transparent to solar radiation mounted along the outside edges of two adjacent support members and overlying a substantial portion of the area therebetween, interior panels means mounted along the inside edges of said two adjacent support members and being parallel to and transversely aligned with said exterior panel means, solar energy absorptive panel means mounted to extend between said two adjacent support members and underlying substantially the full area of said transparent exterior panel means, and such that said two adjacent support members, interior panel means, and solar energy absorptive panel means collectively define an air passageway, additional exterior panel means mounted along the outside edges of the support members and such that said transparent panel means and additional panel means are substantially co-planar and collectively define the exterior surface of said wall structure, and means for conveying air along said passageway, whereby solar energy is able to pass through said transparent exterior panel means and warm said solar energy absorptive panel means, and the air passing along said solar energy absorptive means absorbs heat therefrom.

2. The wall structure as defined in claim 1 further comprising a tubular conduit mounted in heat transfer relationship to said solar energy absorptive panel means, and means for conveying water through said tubular conduit.

3. The wall structure as defined in claim 1 wherein said solar energy absorptive panel means comprises a metallic sheet having a dark surface facing said transparent exterior panel means.

4. The wall structure as defined in claim 1 wherein said transparent exterior panel means and said additional exterior panel means each have a like, corrugated cross-sectional configuration.

5. The wall structure as defined in claim 1 wherein said solar energy absorptive panel means comprises a plurality of panels disposed in an end-to-end arrangement, with each panel comprising a generally rectangular sheet of metallic heat conducting material and having a generally planar first surface facing said exterior panel means, an opposite surface facing said air passageway, opposite side edges joined to said two adjacent support members, and opposite end edges, said sheet being composed of a plurality of interconnected side by side sections, with each section extending between said end edges and having a generally U-shaped cross-sectional configuration to define a planar medial portion and outwardly extending sides, and with the adjacent sides of adjacent sections forming parallel fins extending outwardly from the opposite surface of the sheet and between said opposite end edges.

6. The wall structure as defined in claim 5 wherein each of said panels further comprises slot means mounted along one of said end edges receiving the other end edge of another like panel therein, whereby said panels are joined in an end-to-end arrangement and with said fins extending in a common direction.

7. The wall structure as defined in claim 6 wherein portions of each said panel along each of said side edges are offset in a common direction, and such that said offset side edge portions are co-planar with each other and parallel to the plane of said first surface.

8. The wall structure as defined in claim 1 further comprising means closing the area between said transparent exterior panel means and said solar energy absorptive panel means to the entry of outside air, to thereby form an insulating airspace therebetween.

9. The wall structure as defined in claim 1 wherein said additional exterior panel means are non-transparent.

10. A building structure having a solar energy collector integrally incorporated therein, and wherein the solar energy collector is characterized by the absence of components which protrude outwardly beyond the normal contour of the building structure, and comprising
a plurality of parallel, spaced apart structural beams,
a plurality of parallel, spaced apart support members attached to and extending perpendicularly between said structural beams to define an exterior wall structure of said building structure,
exterior panel means which are transparent to solar radiation mounted to the outside edges of two adjacent support members and overlying a substantial portion of the area therebetween,
interior panel means mounted to the inside edges of said two adjacent support members and being generally parallel to and transversely aligned with said exterior panel means,
solar energy absorptive panel means mounted parallel to and intermediate said exterior and interior panel means, such that said two adjacent support members, interior panel means, and solar energy absorptive panel means collectively define an air passageway, and
means for conveying air along said air passageway and in heat transfer relationship with said solar energy absorptive panel means, whereby the solar energy is able to pass through said exterior panel means and warm said solar energy absorptive panel means, and the air passing through said passageway absorbs heat from said solar energy absorptive panel means.

11. The building structure as defined in claim 10 further comprising non-transparent exterior panel means mounted to the outside edges of said support members such that said transparent exterior panel means and said non-transparent exterior panel means are substantially co-planar and collectively cover the exterior surface of said exterior wall structure.

12. The building structure as defined in claim 11 wherein said solar energy absorptive panel means comprises a generally flat metallic sheet having a dark, energy absorbing surface facing said transparent exterior panel means.

13. The building structure as defined in claim 12 wherein said solar energy absorptive panel means further comprises integrally formed fins positioned on the side of the sheet facing said passageway and extending in a direction parallel to the direction of air flow therethrough, whereby the fins act to facilitate heat transfer to the air passing through said passageway.

14. The building structure as defined in claim 13 wherein said interior panel means comprises a heat insulating material.

15. The building structure as defined in claim 10 wherein said air conveying means comprises air duct means extending between the interior of said building structure and said passageway, and blower means for conveying air through said air duct means and passageway.

16. The building structure as defined in claim 10 wherein said support members extend in a horizontal direction, and said exterior wall structure forms a vertical exterior wall of said building structure.

17. The building structure as defined in claim 10 wherein said support members extend in a horizontal direction, and said exterior wall structure forms at least a portion of the roof of said building structure.

* * * * *